United States Patent Office 2,850,832
Patented Sept. 9, 1958

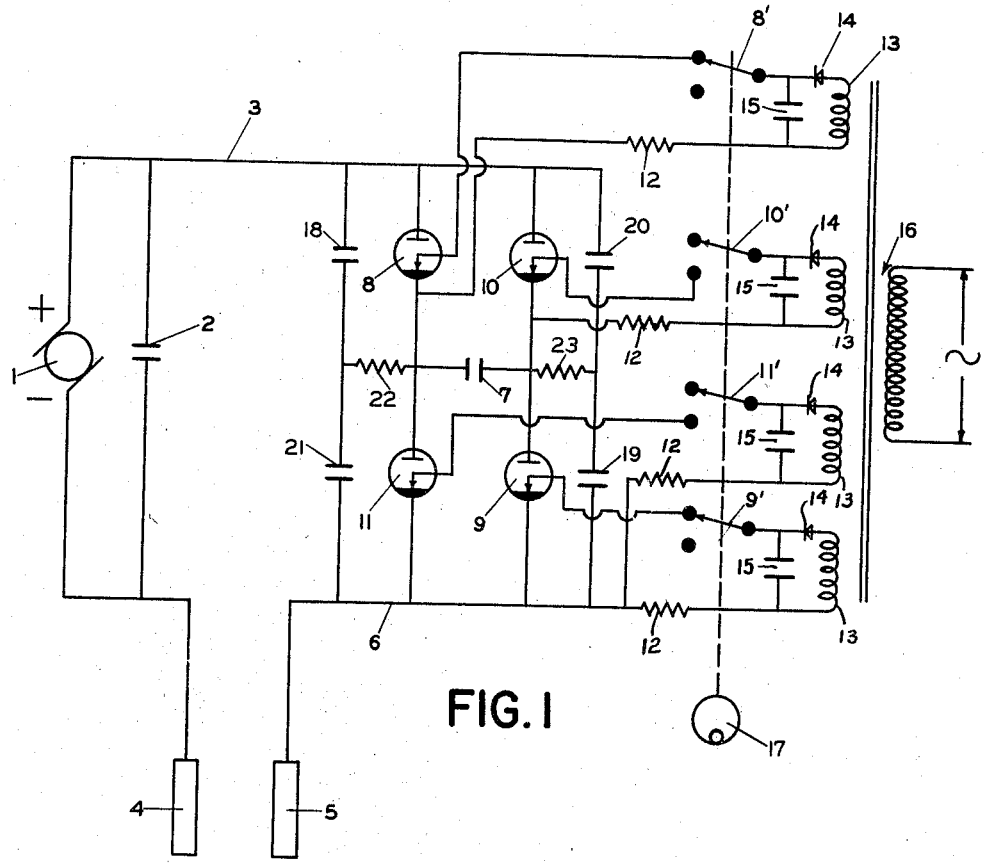

2,850,832

ELECTRO-FISHING APPARATUS

Conradin Otto Kreutzer, Meersburg, Germany, assignor to Fish Products Company, Lewes, Del., a corporation of Delaware Application September 13, 1956, Serial No. 609,559

5 Claims. (Cl. 43—17.1)

My copending U. S. application, S. N. 525,933, which issued on Oct. 2, 1956 as Patent No. 2,764,832, discloses a means for periodically firing electro-fishing impulses through sea water comprising: (1) a large storage capacitor connected across first and second line terminals; (2) a D. C. generator connected across said terminals to charge said storage capacitor continuously; (3) spaced first and second electrodes immersed in sea water; (4) a first cable connecting the first line terminal to the first electrode; (5) a pair of normally open branch lines for connecting the second terminal to the second electrode, each branch serially containing a different pair of normally open or non-conductive arc-type tubes and the same "voltage doubling" capacitor which is serially connected in one way with and between the tubes of one branch for firing operation in one direction and in the reverse way with and between the tubes of the other branch for firing operation in the opposite direction so that said capacitor is operative, when electrically charged in one direction, to condition one branch for (and block the other against) firing operation therethrough, and, when electrically charged in the opposite direction, to condition the other branch for (and block the one branch against) firing operation therethrough; (6) a plurality of normally inoperative triggering means, one for each tube, each being operable, when actuated, to trigger its tube into momentary conductivity by discharging therethrough an electrical "triggering" current which is relatively small in comparison to the electro-fishing impulse; and (7) means for periodically actuating the triggering means of both tubes in each conditioned branch so as to cause said source not only to fire alternately first through one branch and then the other but also to reverse the polarity of said voltage doubling capacitor during each firing so that it becomes effective, when reversed, to stop the firing through the firing branch and to condition the non-firing branch for the next firing operation.

Since each branch circuit includes two normally "open" or non-conductive tubes, both of them must be rendered conductive or "closed" at the same time in order to close the firing circuit through them. Also, since each triggering circuit involves the flow of a relatively heavy current (with a peak value of say 30 amps.) to render its tube conductive, practical power considerations necessarily limit the duration of this triggering impulse to a very short period of time, e. g. one ten-thousandth of a second. When these triggering currents fall below a certain value (say 2 amps.) they are no longer effective in maintaining conductivity. Some difficulty has heretofore been encountered in triggering both tubes in one branch circuit in such timed relationship as to cause their very short periods of "effective" conductivity to overlap and thereby close the firing circuit through that branch.

The principal object of this invention is to provide an improved circuit arrangement in which at least one tube of a given branch, once triggered into conductivity for a normally short period of time, will remain conductive thereafter for a relatively longer period of time, which is sufficient to insure the closure of the firing circuit through that branch.

Another important object is to accomplish the principal object even when the normal triggering current flows for the different tubes in one branch fail to overlap each other.

Another object of this invention is to provide a more dependable and trouble free electro-fishing impulse generator circuit.

My objects in this invention can be largely attained by providing, for at least one tube, a supplementary means, which, when the tube is normally triggered into momentary conductivity, becomes operative to maintain it conductive for a relatively longer period of time by discharging an independent electrical current through the tube for said relatively long period of time. The supplementary means for any given tube may be in the form of a capacitor connected across that tube with a resistor connected in series with the capacitor to restrict its current to a low but operative value and thereby render it operative over a correspondingly long time. With this arrangement, when the voltage doubling or pulsing capacitor reverses its polarity to stop firing in one branch and condition the other branch for firing, the supplementary capacitor for said other branch is simultaneously charged and thus conditioned for its supplementary operation.

An embodiment of the invention is illustrated in the accompanying drawing wherein:

Fig. 1 is a circuit diagram illustrating the application of the supplementary means to both tubes in each branch line;

Fig. 2 is a diagram illustrating the approximate shape of the current impulses discharged between the fishing electrodes; and Fig. 3 is a modified secondary circuit for the electro-fishing circuit of Fig. 1 utilizing adjustable capacitors and resistors.

The illustrated embodiment of my impulse generating and firing circuit includes: a D. C. generator 1; a large capacity capacitor 2 connected across the generator 1; a bus bar 3 connected to the positive side of the generator; a fishing electrode 4 connected to the negative side of the generator 1; another electrode 5; a bus 6 connected to the electrode 5; two branch lines, each extending from bus 3 to bus 6 and each including a "pulsing" or "voltage doubling" capacitor 7, one branch line extending from bus 3 successively through ignitron 8, doubling capacitor 7 and ignitron 9 to bus 6 and the other branch line extending from bus 3 successively through ignitron 10, the same doubling capacitor 7 and ignitron 11 to bus 6; a plurality of normally inoperative triggering circuit means, one for each tube, each comprising a resistor 12, a transformer secondary 13 of a suitably energized transformer 16, a rectifier 14 in series with the secondary 13 and a capacitor 15 connected across the secondary 13 and rectifier 14, the terminals of each capacitor 15 being connected with the triggering or firing terminals of the corresponding tube (8, 9, 10 or 11) through a normally-open circuit having a normally-open periodically-closable switch designated by a prime number corresponding to its tube, e. g., 8', 9', 10' or 11'; and a cam operated mechanism 17 for periodically and alternately closing the switches 8' and 9' of the triggering means of both tubes in one branch and then the switches 10' and 11' in the other branch.

In explaining the operation of the foregoing circuit arrangement as it appears in Fig. 1, we assume that the doubling capacitor 7 is fully charged in a direction such as to have its negative side on the left so as to "condition" the branch containing ignitrons 8 and 9 for firing operation therethrough and, at the same time, block the other branch against such operation. Now, if we close the triggering circuits of the other "unconditioned" branch, so as to trigger the ignitrons 10 and 11 concurrently into momentary conductivity, nothing happens because the doubling capacitor 7 is fully charged in a direction such as to have its positive side on the right and therefore such as to oppose any current flow from positive bus 3 through ignitron 10 to the positive side of capacitor 7. On the other hand, when the cam 17 closes the switches 8' and 9', as seen in Fig. 1, it will trigger the ignitrons 8 and 9 of the conditioned branch because doubling capacitor 7 will not oppose a current flow from positive bus 3 through ignitron 8 to the negative side of capacitor 7.

As a consequence, the voltage across capacitor 7 is added to the voltage of storage capacitor 2 and the sum total thereof becomes effective to discharge a current impulse 24 (Fig. 2) through the water. The magnitude of this current impulse 24 is, of course, a matter of impulse voltage over the impedance of the discharge circuit. Although both capacitors 2 and 7 will normally discharge at identical current rates, storage capacitor 2 should be much larger than doubling capacitor 7 and therefore capacitor 7 will be completely discharged or exhausted much earlier. When doubling capacitor 7 is fully discharged, the storage capacitor 2 will, nevertheless, continue to discharge and thereby begin to charge capacitor 7 in the opposite direction. The storage capacitor continues to discharge until, but stops when, the capacitor 7 becomes fully charged in the opposite direction. Now its polarity has been reversed so as to place its positive side on the left and its negative side on the right. The quantity of current thus discharged through the water is equal to twice the capacity of the smaller capacitor 7 while the time over which the discharge takes place is equal to the time required to discharge and charge capacitor 7. By speaking of discharging and charging of capacitor 7, I mean changing it from a fully charged condition of one polarity to a fully charged condition of reverse polarity. When capacitor 7 becomes fully charged in the opposite direction, it not only blocks the branch, containing ignitrons 8 and 9, but, at the same time, conditions the branch, containing ignitrons 10 and 11 for the next firing operation. Now the simultaneous triggering of both the ignitrons 10 and 11 will cause another current impulse 24 to be discharged through the water between the electrodes 4 and 5. These current impulses 24 will continue to be periodically discharged as shown in Fig. 2 by periodically and alternately triggering the ignitron pairs 8, 9 and 10, 11.

The foregoing circuit requires both ignitrons in each branch to be triggered into momentary conductivity during the same period. Since their triggering circuit means, however, operates to render these tubes conductive for an extremely short interval of time, i. e., approximately 100 micro-seconds, the timing of these two triggering means was somewhat critical. As a consequence, a slight variation in the timing adjustment between the triggering means of one branch resulted in the tubes of that branch becoming conductive during different non-overlapping time intervals. In this event, the circuit cannot fire or conduct through that branch and therefore a corresponding impulse is not discharged between the fishing electrodes.

Broadly speaking, my prior circuit comprises: means for periodically firing an electrical impulse through a firing circuit serially containing a pair of normally non-conductive arc-type tubes, said means operating to fire when both tubes become concurrently conductive; and simultaneously operated means for triggering each tube into momentary conductivity by flowing an electrical current therethrough for a short period of time. In accordance with the present invention, this circuit is improved by providing, for one tube, supplementary means operable, once such tube is triggered, to maintain it conductive for a relatively longer period of time by discharging an independent electrical current therethrough for said relatively longer period of time. In this manner, one ignitron of one branch circuit can be normally triggered into momentary conductivity earlier than the other and thereafter maintained conductive until the other is triggered into momentary but overlapping conductivity so as to complete the closing of a firing circuit. While the invention can thus be usefully employed on only one of a pair of ignitrons, preferably both ignitrons are provided with supplemetary means.

While any form of supplementary means capable of supplying an independent electrical current through the ignitron when the latter becomes conductive, may be employed, a simple and effective supplementary means may be provided simply by connecting a secondary RC circuit across each ignitron.

Accordingly, capacitors 18, 19, 20 and 21 are connected in parallel with corresponding ignitrons 8, 9, 10 and 11 with a common resistor 22 being connected in series with both capacitors 18 and 21 to complete the parallel secondary RC circuits of ignitrons 8 and 11 and a resistor 23 being connected in series with both capacitors 20 and 19 to complete the parallel secondary RC circuits of ignitrons 10 and 9.

The action of these supplementary circuits is identical for each ignitron. For example, once ignitron 8 is triggered, capacitor 18 will begin discharging through ignitron 8 and resistor 22 and accordingly maintain the ignitron 8 conductive after the main triggering circuit for ignitron 8 has become inoperative. During the firing of the branch circuit containing ignitrons 8 and 9, the supplementary capacitors 18 and 19 associated with that branch will become exhausted while those (20 and 21) associated with the other branch will become fully charged. In other words, while the polarity of capacitor 7 is reversed to stop firing in one branch and condition the other branch for the next firing operation, the supplementary capacitors for the conditioned branch are simultaneously charged. The values of capacitors 18, 19, 20 and 21 and resistors 22 and 23 can be selected to provide the ignitrons with the proper amount of current flow and potential for a limited time period necessary to insure that the triggering period of each ignitron in each branch line overlaps the triggering period of the other ignitrons in the same branch line.

In order to provide an adjustment to the secondary circuits, the fixed capacitors and resistors shown in Fig. 1 can be replaced with adjustable capacitors and resistors. Fig. 3 illustrates this modification of the secondary circuits of the ignitrons 8 and 11, the fixed secondary capacitors 18 and 21 being replaced by adjustable capacitors 28 and 32, and the fixed resistor 22 being replaced by a pair of adjustable resistors 29 and 30 connected in parallel with each other and in series with a fixed resistor 31.

Having described my invention, I claim:

1. An improvement in electro-fishing apparatus, comprising: means for periodically firing electro-fishing impulses through a firing circuit serially containing a pair of normally nonconductive arc-type tubes, said means operating to fire when both tubes become concurrently conductive; periodically operated means for triggering both tubes substantially concurrently into momentary conductivity by flowing an electrical current therethrough for a short period of time; and supplementary means associated with one tube of said pair and operable, once such tube becomes conductive, to maintain it conductive for a relatively longer period of time by discharging an independent electrical current therethrough for said relatively longer period of time.

2. The improvement of claim 1 wherein: said supplementary means comprises a RC circuit connected in parallel with said one tube.

3. An electro-fishing apparatus comprising: a pair of fishing electrodes adapted to be relatively spaced and immersed in sea water; an impulse discharge circuit connected to energize said electrodes periodically with current impulses; said circuit including a source of electrical energy, a pair of periodically actuated arc-type tubes connected in series with said source and periodically operated means for triggering both tubes substantially concurrently into momentary conductivity, said triggering means rendering each of said tubes conductive for a short period of time; and a pair of secondary circuits, one for each of said tubes, each secondary circuit being connected in said discharge circuit in parallel with its tube and cooperating therewith to form a closed secondary circuit upon the triggering of its tube, each secondary circuit containing means for creating a flow of electrical energy in said closed secondary circuit for a relatively longer period of time after the triggering of its tube.

4. The apparatus of claim 3 wherein: each of said secondary circuits comprises a suitable resistor and capacitor in series forming a RC circuit.

5. An electro-fishing impulse generator comprising: a capacitor charging source of direct current; a pulsing capacitor; a pair of branch circuits for periodically and successively reversely interconnecting the poles of said capacitor relatively across said charging source, each branch circuit including a pair of arc-type tubes, each tube interconnecting an opposite pole of said capacitor to an opposite side of said source; means for periodically and alternately triggering both tubes of one branch and then the other branch to cause them to become conductive for a short period of time; and secondary means operable to maintain conduction in one tube of each branch for a relatively longer period of time after triggering by discharging an independent electrical current therethrough for said relatively longer period of time.

References Cited in the file of this patent

UNITED STATES PATENTS

| | | |
|---|---|---|
| Re. 21,919 | Alexanderson | Oct. 14, 1941 |
| 2,008,730 | Smede | July 23, 1935 |
| 2,261,144 | Dawson | Nov. 4, 1941 |
| 2,764,832 | Kreutzer | Oct. 2, 1956 |